Jan. 11, 1927.

M. P. HOLMES

ELEVATING MECHANISM

Filed June 17, 1921

1,614,030

Inventor:
Morris P. Holmes
by
atty.

Patented Jan. 11, 1927.

1,614,030

UNITED STATES PATENT OFFICE.

MORRIS P. HOLMES, OF CLAREMONT, NEW HAMPSHIRE, ASSIGNOR TO SULLIVAN MACHINERY COMPANY, A CORPORATION OF MASSACHUSETTS.

ELEVATING MECHANISM.

Application filed June 17, 1921. Serial No. 478,425.

My invention relates to elevating mechanism, and especially, although not exclusively, to elevating mechanism for truck mounted mining machines.

It has for its object to provide a simple and efficient mechanism which may be manually operated with relatively little effort to raise or lower a machine or other object to any desired elevation, or to tilt the same into any desired position, within the range of the apparatus, thereby, in the case of a mining machine, enabling said machine to cut a kerf in a mine face at any required height or inclination to the horizontal.

The foregoing and other objects of the invention, together with means whereby the same may be carried into effect, will best be understood from the following description of one form or embodiment thereof illustrated in the accompanying drawings, in which,—

Figure 1:
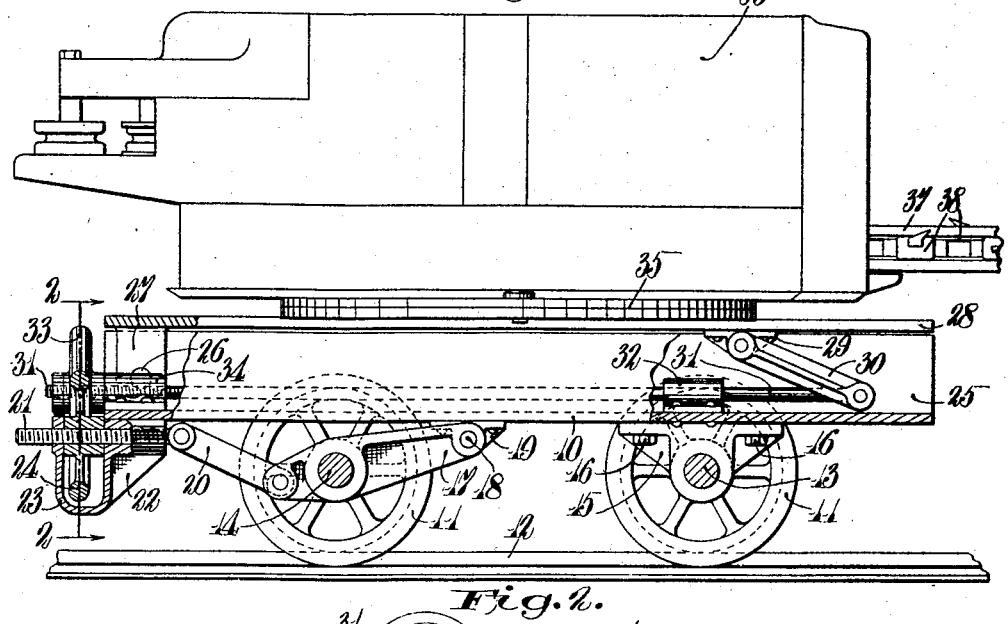
Fig. 1 is a side elevation, partly broken away, of a mining machine truck embodying the invention and having a mining machine mounted thereon.
Figure 2:
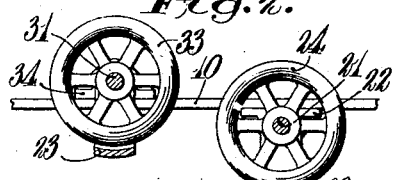
Fig. 2 is a fragmentary sectional view partially in elevation taken substantially on the line 2—2 of Fig. 1, showing the hand wheels for operating the elevating mechanism.

The invention is shown as embodied in a mining machine truck comprising a body 10 provided with wheels 11 adapted to run upon a track 12. As is usual, two pairs of wheels are provided, said pairs of wheels being connected by front and rear axles 13 and 14 respectively. The front axle 13 is carried by bolsters or brackets 15 fixed to the under side of the body 10 adjacent the forward end of the latter, as by bolts 16. The rear axle 14 is carried by one or more levers 17 pivoted at 18 to a bracket or brackets 19 also bolted or otherwise secured to the under side of the body 10. Pivotally connected at one end to the lever 17 is a toggle link 20 pivoted at its opposite end to a screw or threaded rod 21 guided for longitudinal movement in a bracket 22 bolted or otherwise secured to the under side of the truck body 10 adjacent the rear end of the latter. The bracket 22 is formed with a U-shaped keeper portion 23 through which the rod or screw 21 extends and in which is held a hand wheel 24 in threaded engagement with said rod or screw.

The truck body 10, which constitutes a lower support, is preferably formed with upwardly disposed, longitudinally extending, vertical side flanges 25 to which are pivoted, upon coaxially disposed studs 26, ears or flanges 27 formed on the rear end of a platform or upper support 28. The axis of the studs 26 is substantially parallel to the axles 13 and 14 and is, of course, spaced a considerable distance from the front axle 13 in a direction longitudinal of the truck. Bolted or otherwise secured to the under side of the platform 28 adjacent the forward end of the latter is a bracket 29 to which is pivotally connected one end of a toggle link 30. Said toggle link is pivotally connected at its opposite end to a rod 31 guided for longitudinal movement in a bracket 32 bolted or otherwise secured to the upper side of the floor of the truck body 10, said rod extending to the rear end of the truck and having a threaded rear end guided in a bracket 34 similar to the bracket 22 and bolted or otherwise secured adjacent to said bracket 22 to the upper side of the floor of the truck body 10. The bracket 34 is also formed with a keeper portion 23 cooperating with a hand wheel 33 in threaded engagement with the rear end of the rod 31.

The mining machine is mounted upon or carried by the upper support or platform 28, a suitable turn-table 35 being, if desired, interposed between said machine and platform. Said machine, as herein shown, is of the well-known room and pillar type comprising a casing 36 having at its forward end a forwardly extending, rigid cutter bar 37 provided with a cutter chain 38.

Figure 3:
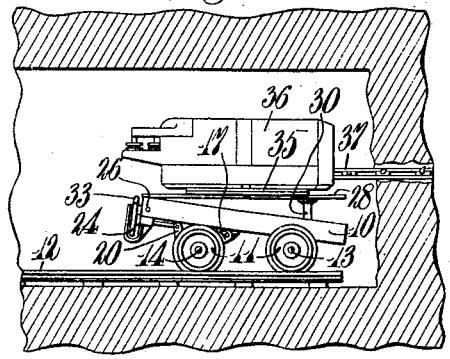
Figs. 3 and 4 are diagrammatic views illustrating the operation of the apparatus.
Figure 4:
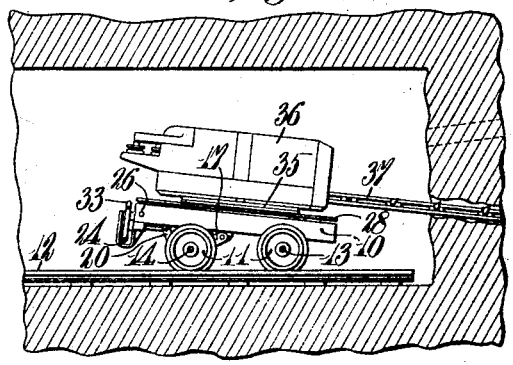

The operation of the apparatus is illustrated in Figs. 3 and 4. Should it be desired to tilt the machine forwardly, in order to enable the cutter bar 37 to cut a kerf which is forwardly and downwardly inclined, as shown in full lines in Fig. 4, the hand wheel 24 is operated to swing the lever 17 downwardly about its pivot 18, thereby depressing the rear axle 14 with respect to the truck body, and consequently elevating the rear end of said truck body which, during this operation, tilts about the axis of the front axle 13. In order to elevate the machine, while maintaining a substantially horizontal position thereof, as illustrated in Fig. 3, the hand wheel 24 is first operated to tilt the truck body 10 as above described, and the hand wheel 33 thereafter operated to draw the rod 31 rearwardly, thereby causing the toggle link 30 to elevate the forward end of the platform 28 which, during this operation, will tilt about the axis of the pivot studs 26. In order to tilt the machine into such position as to cause the cutter bar 37 to cut an upwardly and forwardly inclined kerf, as indicated in dotted lines in Fig. 4, the hand wheel 33 may be operated to tilt the platform 28 without first operating the hand wheel 24 to tilt the truck body 10, as will be understood without further explanation.

It will thus be seen that, by reason of the pivotal mounting of the truck body or lower support 10 and the pivotal connection thereto of the platform or upper support 28, whereby said supports are adapted to tilt about spaced axes disposed respectively adjacent the forward and rear ends of the apparatus, together with the provision of operating devices for both of said supports located adjacent one another at the rear end of the truck, the platform 28 and the machine carried thereby may, by suitable manipulation of either or both of said operating devices, be made to assume any angular position or any elevation within the range of the apparatus. In Fig. 4 the machine is shown tilted forwardly to substantially the limit of the operating means, while in Fig. 3 said machine is shown in a horizontal position at substantially its maximum elevation, but it will be obvious that said machine is capable of assuming substantially any position between the positions shown and the normal lowermost horizontal position shown in Fig. 1. It will also be seen that, while the elevated machine is shown in horizontal position in Fig. 3, and while the tilted machine is shown in its lowermost position in Fig. 4, said machine may, by suitable operation of the hand wheels, be both elevated and tilted in accordance with the requirements. These and other advantages of the invention, however, will be apparent to those skilled in the art without further explanation.

While I have in this specification shown and described in detail one embodiment which the invention may assume in practice and one use to which the same may be put, it will be understood that the particular construction, arrangement, and adaptation disclosed have been chosen for illustrative purposes merely, and that the invention may be otherwise embodied and practiced without departing from its spirit or the scope of the claims hereunto appended.

What I claim as new and desire to secure by Letters Patent is:

1. The combination with a wheel mounted tilting lower support, tiltable about the axes of certain of its wheels, of an upper support mounted on said lower support to tilt about an axis spaced from the axis of movement of said lower support and adjacent to the opposite end of said lower support.

2. The combination with a wheel mounted lower support mounted to tilt about a transverse axis adjacent one end thereof, and with which certain of its supporting wheels are concentric, of an upper support mounted on said lower support to tilt about a transverse axis adjacent to the opposite end of said lower support.

3. The combination with a wheel mounted tilting lower support, tiltable about the axes of certain of its wheels, of an upper support mounted on said lower support to tilt about an axis spaced rearwardly from the axis of movement of said lower support, and means to tilt said supports.

4. The combination with a tilting lower support, tiltable about the axes of certain of its wheels, of an upper support mounted on said lower support to tilt about an axis spaced from the axis of movement of said lower support, toggle mechanisms for tilting said supports, and hand wheels for operating said toggle mechanisms respectively.

5. The combination with a tilting lower support, of an upper support mounted on said lower support to tilt about an axis spaced from the axis of movement of said lower support, separate means for tilting each of said supports, and operating devices for said tilting means respectively, said operating devices being located in fixed relative positions closely adjacent one another.

6. The combination with a lower support mounted to tilt about a transverse axis adjacent one end thereof, of an upper support mounted on said lower support to tilt about a transverse axis adjacent the other end of said lower support, a toggle mechanism for tilting each of said supports, and a hand wheel for operating each of said toggle mechanisms, both of said hand wheels being located at one end of said lower support.

7. In a mining machine, the combination with a tilting support, of kerf cutting mechanism mounted on said support to tilt about an axis spaced from the axis of tilting movement of said support and extending toward and beyond the pivot of said tilting support.

8. In a mining apparatus, the combination with a lower support mounted to tilt about a transverse axis adjacent one end thereof, of an upper support mounted on said lower support to tilt about a transverse axis adjacent the other end of said lower support, a mining machine mounted on said upper support, said mining machine having a forwardly extending cutter bar, and means including toggle mechanisms operable from the rear end of said machine for tilting said supports.

9. In a mining apparatus, the combination with a lower support mounted to tilt about a transverse axis adjacent one end thereof, of an upper support mounted on said lower support to tilt about a transverse axis adjacent the other end of said lower support, a mining machine mounted on said upper support, said mining machine having a forwardly extending cutter bar, a toggle mechanism for tilting each of said supports, and a hand wheel located at the rear end of said lower support for operating each of said toggle mechanisms.

10. The combination with a wheeled truck having a tilting body tiltable about the axes of certain of its wheels, of a platform mounted on said body to tilt about an axis spaced from the axis of movement of said body.

11. In a mining machine, the combination with a wheeled truck having a tilting body, of kerf cutting mechanism swively mounted on said body and tiltable about an axis parallel to but spaced from the axis of movement of said body.

12. In a truck, a truck body having axles provided with wheels, a support for one of said axles fixed with respect to said body, a lever pivoted to said body and by which the other of said axles is carried, and means for swinging said lever on said body to move the latter about said first mentioned axle.

13. In a truck, a truck body having axles provided with wheels, a support for one of said axles fixed with respect to said body, a lever pivoted to said body and by which the other axle is carried, means for swinging said lever on said body, and a platform carried by said body and pivotally connected thereto to tilt about an axis substantially parallel to said axles.

14. In a truck, a truck body having axles provided with wheels, a support for one of said axles fixed with respect to said body, a lever pivoted to said body and by which the other of said axles is carried, a toggle link pivoted to said lever, a screw for operating said link, and a hand wheel for operating said screw.

15. In a mining apparatus, the combination with kerf cutting mechanism of a truck by which said mechanism is carried, said truck comprising a body having axles provided with wheels, a support for one of said axles fixed with respect to said body, a lever pivoted to said body and by which the other of said axles is carried, and means for swinging said lever on said body to move the latter about said first mentioned axle.

16. In a mining machine, the combination with a truck comprising a truck body having axles provided with wheels, a support for one of said axles fixed with respect to said body, a lever pivoted to said body and by which the other of said axles is carried, means for swinging said lever on said body, and kerf cutting mechanism mounted on said body to tilt about an axis substantially parallel to said axles.

17. The combination with a support, of a platform pivoted to said support, and elevating mechanism for said platform including a toggle link pivoted to said platform, a rod connected to said link, and means on the opposite side of said pivot from said toggle for operating said rod to tilt said platform.

18. The combination with a tilting support, of a platform mounted on said support to tilt about an axis spaced from the axis of movement of said support, and elevating mechanism for said platform including a toggle link pivoted to said platform, a rod connected to said link, and means for operating said rod to tilt said platform on said support.

19. In a truck, in combination, a truck body having axles provided with wheels, a support for one of said axles fixed with respect to said body, a lever pivoted to said body and by which the other of said axles is carried, means for swinging said lever on said body, a platform pivoted to said body, a toggle link pivoted to said platform, a rod connected to said link, and means for operating said rod.

20. In a truck, in combination, a truck body having axles provided with wheels, a support for one of said axles fixed with respect to said body, a lever pivoted to said body and by which the other of said axles is carried, a rod for swinging said lever on said body, a platform pivoted to said body, a toggle link pivoted to said platform, a rod connected to said link, and devices, both located at one end of said body, for operating said rods.

21. The combination with a wheeled support movable over a trackway, of a platform pivoted to said support having provision for operatively receiving a mining machine, a toggle link pivoted to said platform, a threaded rod connected to said link, and a hand wheel for operating said rod and located on the opposite side of said pivot from said toggle.

22. In a truck, a truck body having axles provided with wheels and a support for one of said axles fixed with respect to said body, a lever pivoted to said body and by which the other of said axles is carried, a toggle link pivoted to said lever, a screw for operating said link, a hand wheel for operating said screw, a platform pivoted to said body, a toggle link pivoted to said platform, a threaded rod connected to said link, and a hand wheel for operating said rod.

23. In a truck, a truck body having axles provided with wheels and a support for one of said axles fixed with respect to said body, a lever pivoted to said body and by which the other of said axles is carried, a toggle link pivoted to said lever, a screw for operating said link, a hand wheel for operating said screw, a platform pivoted to said body, a toggle link pivoted to said platform, a threaded rod connected to said link, and a hand wheel for operating said rod, both of said hand wheels being located at one end of said truck.

24. In a mining apparatus, the combination with a support, of a platform pivoted to said support, kerf cutting mechanism carried by said platform and extending in the same direction as the free end thereof, a toggle link pivoted to said platform, a rod connected to said link, and means for operating said rod to tilt said platform and kerf cutting mechanism.

25. In a mining apparatus, in combination, a truck body having axles provided with wheels, a support for one of said axles fixed with respect to said body, a lever pivoted to said body and by which the other of said axles is carried, means for swinging said lever to tilt said body, a platform pivoted to said body, kerf cutting mechanism carried by said platform, a toggle link pivoted to said platform, a rod connected to said link, and means for operating said rod to tilt said platform and kerf cutting mechanism on said body.

26. In a mining apparatus, the combination with a wheeled truck having a tilting body, of a platform mounted on said body to tilt about an axis spaced from the axis of movement of said body, kerf cutting mechanism carried by said platform and extending in the same direction as the free end thereof, a toggle link pivoted to said platform, a rod connected to said link, and means for operating said rod to tilt said platform and kerf cutting mechanism on said body.

27. Mining apparatus comprising a wheeled frame having a tiltable portion and a tiltable support pivoted on said portion adjacent the opposite end thereof from its pivot, said tiltable portion and support overlying one another and the wheels of said frame and extending in opposite directions from their respective pivots.

28. Mining apparatus comprising a wheeled frame having a tiltable portion and a tiltable support pivoted on said portion adjacent the opposite end thereof from its pivot, said tiltable portion and support overlying one another and the wheels of said frame, and extending in opposite directions from their respective pivots, and means for adjusting one of said elements relative to the other element.

29. Mining apparatus comprising a wheeled frame having a tilting portion and a tiltable support pivoted on said portion adjacent the opposite end thereof from its pivot, said tilting portion and support overlying one another and extending in opposite directions from their respective pivots, and means carried by said tilting portion for adjusting the plane of either of said elements relative to the other element.

30. Mining apparatus comprising a wheeled frame having a tilting portion and a tiltable support pivoted on said portion adjacent the opposite end thereof from its pivot, said tilting portion and support overlying one another and extending in opposite directions from their respective pivots, and separate means disposed in fixed relative positions for adjusting said portion and said support.

31. Mining apparatus comprising a wheeled frame having a tilting portion and a tiltable support pivoted on said portion adjacent the opposite end thereof from its pivot, said tilting portion and support overlying one another and extending in opposite directions from their respective pivots, and means for adjusting said portion and said support disposed in fixed relative positions in rear of the pivot of said portion.

32. Mining apparatus comprising a wheeled frame having a tilting portion and a tiltable support pivoted on said portion adjacent the opposite end thereof from its pivot, said tilting portion and support overlying one another and extending in opposite directions from their respective pivots, and means on said support including a swivel for receiving a unitary mining machine.

33. Mining apparatus comprising a wheeled frame having a tilting portion and a tiltable support pivoted on said portion adjacent the opposite end thereof from its pivot, said tilting portion and support overlying one another and extending in opposite directions from their respective pivots, and means on said support for receiving a unitary mining machine and including a swivel whereby the angular position of such a machine may be adjusted.

34. A support for a unitary mining machine having provision for carrying the latter with its cutter bar disposed in front of said support, and comprising overlying pivotally connected tiltable portions extending in opposite directions from their pivots, and means disposed in fixed spaced relative positions for adjusting said portions from the rear end of said support.

35. Mining apparatus comprising a support having a plane kerf cutter thereon, front and rear wheels movable over a trackway, and operative connections between said wheels and said support whereby the plate of said kerf cutting mechanism may be adjusted angularly about a plurality of longitudinally spaced transverse axes in rear of said kerf cutting mechanism and in front and in rear of said rear wheels.

36. Mining apparatus comprising a support having a plane kerf cutter swiveled thereon, front and rear wheels movable over a trackway, and operative connections between said wheels and said support whereby the plane of said kerf cutting mechanism may be adjusted angularly about a plurality of longitudinally spaced transverse axes in rear of said kerf cutting mechanism and in front and in rear of said rear wheels.

37. In a mining apparatus, the combination with a lower support mounted to tilt upon an axis adjacent one end thereof, of an upper support mounted on said lower support to tilt about an axis adjacent the other end of said lower support, a unitary mining machine mounted on said upper support, said mining machine having a forwardly extending cutter bar, and means including screw operated toggle mechanisms operable from the rear end of said machine tilting said supports.

38. In a mining apparatus, a tiltable wheeled truck frame, a tiltable supporting frame carried thereby adapted to receive a unitary mining machine, and means including oppositely rotatable members for elevating said machine into different horizontal and inclined planes.

39. In a mining apparatus, a wheeled truck frame including spaced axles, means to tilt said truck frame in different angular positions about one of said axles as an axis, a support pivotally mounted on said frame having a unitary mining machine mounted thereon and adapted to be swiveled relative thereto, and means to tilt said support to vary the elevation and angular position of said mining machine.

40. In a mining machine truck, constituting a support for a mining machine, a frame, a member pivoted thereon, a wheel carrying axle carried by said pivoted member and parallel to the pivot thereof but offset therefrom, and means permanently supported on and reciprocable longitudinally of said frame operatively connected with said pivoted member to swing the same about its pivot to change the relative position of said frame to said axle.

41. In a mining machine truck constituting a support for a mining machine, a frame, a member pivoted thereon, a wheel carrying axle carried by said pivoted member and parallel to the pivot thereof but offset therefrom, and means including a grooved member reciprocable longitudinally of said frame and a member rotatable to effect longitudinal movement of said grooved member, said reciprocable member operatively connected with said pivoted member to swing the same about its pivot to change the relative position of said frame to said axle.

42. In a mining machine, a mining machine carrying frame provided with front and rear axles and having a plurality of pivoted arms between said frame and said axles, and means for at will tilting said frame about one axle as one pivoted arm is actuated or causing its elevation to be bodily adjusted as both of said pivoted arms are actuated.

43. In a mining machine, a supporting frame carrying a mining machine, truck wheels disposed beneath said frame provided with parallel axles, means for raising and lowering said frame relative to said axles including a plurality of longitudinally spaced pivoted arms, and means operable from the rear end of said frame and machine and cooperating with said arms to cause tilting or bodily elevation of said frame.

44. In a mining machine, a cutter carrying frame, and adjustable supporting means therefor including wheel supported axles spaced longitudinally of said frame and means for supporting said frame on said axles including a plurality of members respectively connected directly to said axles and each having at a point spaced from its axle a pivotal connection, and means cooperating with said members to effect change in space relation between said frame and said members to cause said frame to be adjusted bodily upwards, said means including mechanism reciprocable longitudinally of said frame and operable to effect such a change between said frame and members.

45. In a mining machine, a cutter carrying frame, and adjustable supporting means therefor including wheel supported axles spaced longitudinally of said frame and means for supporting said frame on said axles including a plurality of members respectively connected directly to said axles and each having at a point spaced from its axle a pivotal connection, and means cooperating with said members to effect change in space relation between said frame and said members to cause said frame to be adjusted bodily upwards, said means including mechanism reciprocable longitudinally of said frame and operable to effect such a change between said frame and members, and operating means for said elements operable from a single end of said frame and permitting separate or simultaneous adjustments of said elements to effect tilting of said frame or upward movement of the latter to a series of parallel positions.

In testimony whereof I affix my signature.

MORRIS P. HOLMES.

CERTIFICATE OF CORRECTION.

Patent No. 1,614,030.   Granted January 11, 1927, to

MORRIS P. HOLMES.

It is hereby certified that error appears in the printed specification of the above numbered patent requiring correction as follows: Page 2, lines 67, 75, 82, and 89, claims 1, 2 and 3, page 4, line 62, claim 28, and page 5, line 43, claim 40, strike out the comma; page 3, line 54, claim 15, after the word "mechanism" insert a comma; page 4, line 128, claim 35, for the word "plate" read "plane"; and that the said Letters Patent should be read with these corrections therein that the same may conform to the record of the case in the Patent Office.

Signed and sealed this 22nd day of March, A. D. 1927.

Seal.

M. J. Moore,
Acting Commissioner of Patents.